Sept. 5, 1967  C. C. STACK  3,339,912
CLAMPING TABLE
Filed April 19, 1965  2 Sheets-Sheet 2
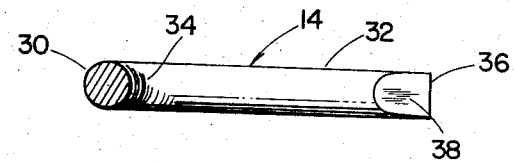
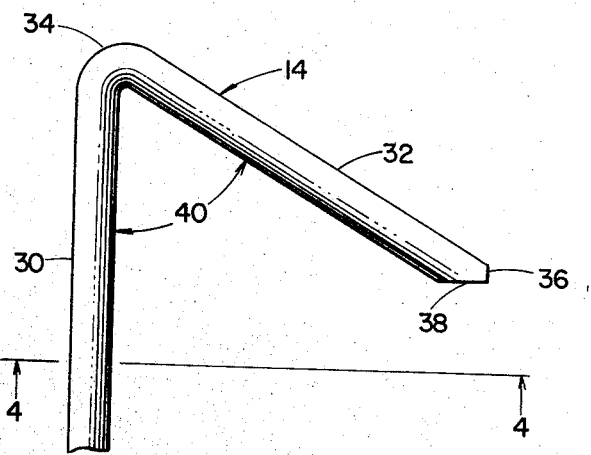
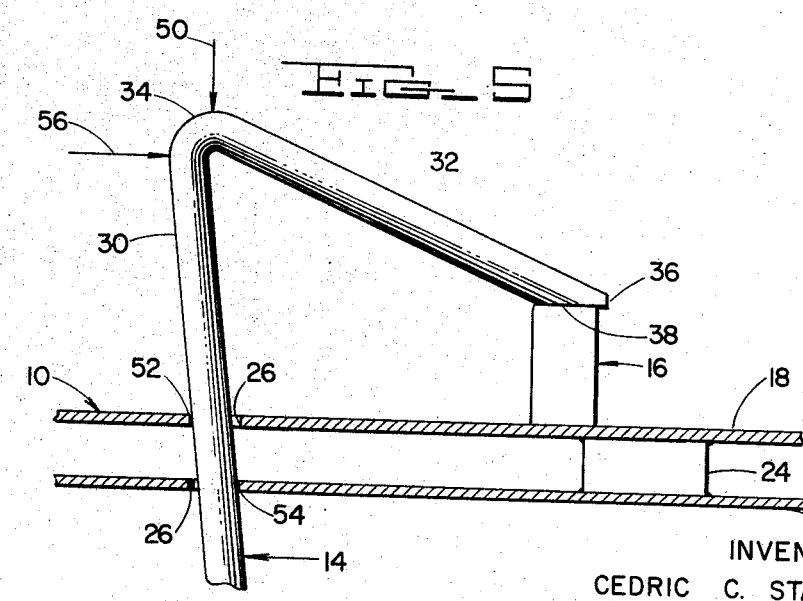
INVENTOR
CEDRIC C. STACK
BY Wood, Gust & Irish
ATTORNEYS

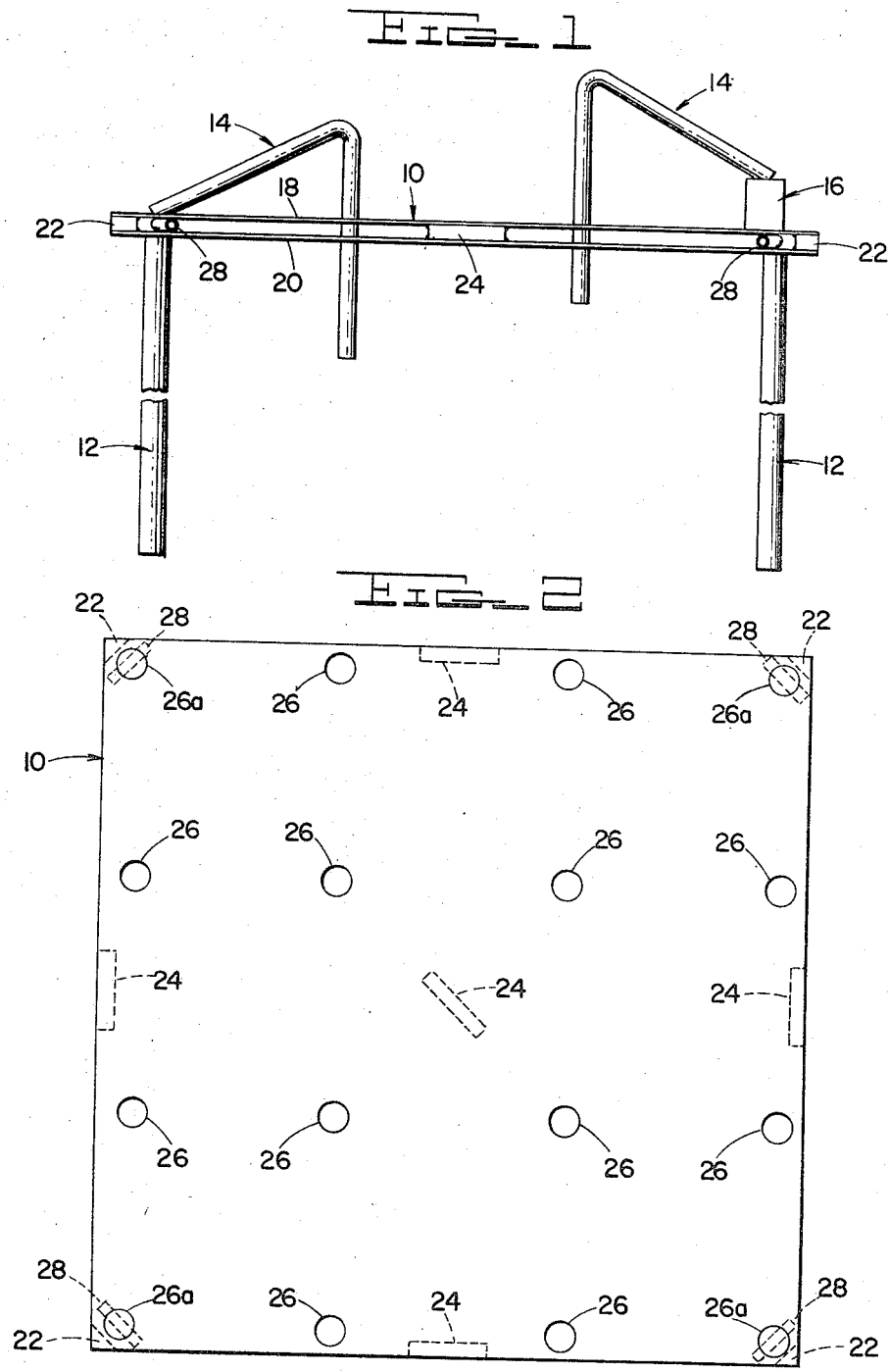

United States Patent Office 3,339,912
Patented Sept. 5, 1967

3,339,912
CLAMPING TABLE
Cedric C. Stack, 1620 S. I St., Elwood, Ind. 46036
Filed Apr. 19, 1965, Ser. No. 449,173
3 Claims. (Cl. 269—166)

ABSTRACT OF THE DISCLOSURE

A work table comprising a pair of spaced, rigid plates formed with plural apertures, each aperture of one plate registering with an aperture in the other plate, and a resilient clamping member having angularly related legs, one of which, when received in a registering pair of apertures, will be wedged against removal when sufficient force is applied to the rod in the direction of the plates to flex the legs apart.

---

The present invention relates generally to a work table, and more particularly, to a clamping table upon which a workpiece can be easily and removably secured.

It has long been desirable to provide a work table upon which a workpiece can be quickly and easily secured to the table top, and then removed when desired. Thus, it is the primary object of this invention to provide a versatile work table upon which a workpiece can be quickly and easily secured to the top of the table and similarly removed.

Another object of this invention is to provide an improved work table on which a workpiece can be clamped in a variety of positions on the table and can be quickly and easily unclamped from the table when desired.

A further object of this invention is to provide an improved work table on which both heavy and light items having both flat and round surfaces can be easily and quickly clamped to the surface of the table and easily and quickly unclamped when desired.

Further objects of this invention will appear as the description proceeds.

To the accomplishment of the above and related objects, my invention may be embodied in the forms illustrated in the accompanying drawings, attention being called to the fact, however, that the drawings are illustrative only and that change may be made in the specific constructions made and illustrated and described as long as the scope of the appended claims is not violated.

In the drawings:

FIG. 1 is a side view of the improved work table of this invention illustrating two of the grip bars positioned in openings in the table adjacent the center thereof and with one of the grip bars in position to be wedged into clamping condition thereby securing an object between the bar and the table top;

FIG. 2 is a top view of the improved clamping table of this invention illustrating in dotted lines the structure intermediate the two rigid metal plates comprising the table top;

FIG. 3 is a fragmentary side view of one of the grip bars of this invention;

FIG. 4 is a cross-sectional view of the grip bar illustrated in FIG. 3 taken substantially along the section line 4—4 of FIG. 3; and FIG. 5 is an enlarged and fragmentary view, partially in cross-section, of one of the grip bars of this invention wedged into clamping position.

In the broader aspects of this invention there is provided a sheet of rigid material having an aperture and an elongated and resilient clamping member having a cross-section of an identical shape and a size smaller than the aperture in the sheet, the member being bent intermediate its ends such that when one leg portion of the member is positioned in the aperture of the sheet and the other leg portion is engaged with an object to be clamped to the sheet, the one leg portion can be frictionally wedged in the aperture in a position inclined to the sheet surface while the other leg portion of the member bears resiliently upon the clamped object, whereby the object is securely held between said other leg portion and the sheet.

Referring to the drawings, the improved work table of this invention is shown to comprise a rigid table top 10 supported by legs 12 and having grip bars or clamping rods 14 which in cooperation with the table top 10 provide means by which objects 16 can be securely clamped to the table top 10. The table top 10 comprises a pair of rigid metal plates 18, 20 which are rectangular in shape and secured together in spaced apart and parallel relation with a plurality of spacers 22, 24 therebetween. Spacers 22 are prismatic in shape so as to fit in between the plates 18, 20 at the corners thereof. Spacers 24 are rectangular in shape and are positioned intermediate the corners of the plates 18, 20 adjacent the periphery thereof and adjacent the center of the plates 18, 20. While there are four spacers 22 and five spacers 24 used in the specific embodiment illustrated, the number of spacers necessary will depend upon the rigidity of the plates 18, 20. The number of spacers 22, 24 illustrated, however, have proven to be satisfactory when the plates 18, 20 are one-quarter inch steel plate, square in shape and measuring two feet by two feet.

Each of the plates 18, 20 has a plurality of circular openings 26 therein having identical diametral dimension and being arranged in rows and columns over the surface of plates 18, 20. Openings 26 are spaced apart equally from adjacent openings in the same row and column. Four of the openings 26 are located adjacent the corners of the plates 18, 20 and are, for reference purposes, marked with a subscript "a." Plates 18, 20 are secured to each other as above-mentioned in registry with each other with each of the openings 26, 26a in the plate 18 in registry with a like opening in the plate 20. Each pair of openings 26, 26a defines a cylindrical aperture in the table top 10. Table top 10 is supported by four elongated and cylindrical legs 12, each of which is positioned in an opening 26a of the plates 18, 20 and removably secured to the table top 10 by means of a roll pin 28 positioned between the plates 18, 20 and frictionally secured in preformed holes (not shown) in the legs 12 adjacent to the top ends thereof. In the specific embodiment illustrated, the openings 26, 26a have a diametral dimension of one inch and are spaced apart over the surfaces of plates 18, 20, respectively, on eight inch centers. The legs 12 comprise fifteen-sixteenths inch cold rolled steel rod with an opening formed therein for the roll pin 28.

Referring now to FIGS. 3 and 4, in which the grip bars 14 of this invention are illustrated, it can be seen that each grip bar 14 comprises a bent rod which has a diameter smaller than the diameter of openings 26 and has two straight leg portions 30, 32 and an elbow portion 34 therebetween. Leg portion 32 has adjacent its distal end 36 a flat clamp surface 38 which is angularly disposed to the longitudinal direction of both leg portions 30, 32 as will be hereinafter mentioned. Leg portion 32 defines with leg portion 30 an acute angle 40 therebetween which has a critical relationship with the dimensions of the openings 26, the distance between plates 18, 20 of the table top 10, the diameter of the leg portion 30 and the resilient properties of the material from which the grip bars 14 are made.

In a specific embodiment in which the table top 10 is made of one-quarter inch plates 18, 20, spaced apart one half inch, and having openings 26 therein which measure one inch in diameter, grip bar 14 is preferably made of cold rolled steel rod with a diameter of fifteen-sixteenth inch and an angle 40 ranging from about fifty-eight degrees to about sixty-five degrees. The length of the portion 30 is determinable by the height of the articles desirably clamped and the length of the portion 32 is determined by the angle 40.

Referring now to FIGS. 1 and 5, the operation of the invention will be described. Whenever it is desired that an object 16 be secured to the table top 10 of the work table of this invention, the leg portion 30 of a grip bar or clamping rod 14 is dropped freely into one of the apertures of the table top 10 with the object 16 between the clamp surface 38 of the leg portion 32 and the upwardly facing surface of the plate 18. In this position, the clamp surface 38 is slightly inclined relative to the plates 18, 20 and the leg portion 30 is loosely positioned in holes 26 and generally longitudinally aligned with the aperture defined thereby. To secure the object 16 between the surface 38 and the plate 18, the grip bar 14 is struck a sharp downward blow adjacent the elbow 34 in the direction of the arrow 50 to resiliently spread the leg portions 30, 32 of the grip bar 14 apart and to wedge the rod portion 30 in the aperture of the table top 10. When the force applied to the grip bar 14 is sufficient, the clamp surface 38 becomes generally parallel with the plate 18 and bears resiliently upon the object 16, while the leg portion 30 is slightly tilted from the vertical and thus becomes wedged in the aperture defined by the two openings 26 in the plates 18, 20 as shown in FIG. 5. In this position, the frictional engagement of the leg portion 30 with the edges 52, 54 of openings 26 in the plates 18, 20, respectively, and the resilient flexure of the bar at the elbow 34 whereby clamping pressure is applied to the object 16, holds the bar 14 in the aforementioned spread-apart relation. Thus, the grip bar 14 is secured into the aperture in the plates 18, 20 and provides a clamping force between the plate 18 and the clamping surface 38. Since the edges 52, 54 of the plates 18, 20 are the only portions of table top 10 which function to secure the grip bar 14 in the aforementioned position, the table top 10 can alternatively be made of a solid sheet of rigid material, however, the preferred embodiment is that which is illustrated in the drawings as a solid sheet of metal having the dimensions of table top 10 would have a weight which would be burdensome and render the working table of this invention less convenient to use.

While the specific dimensions of the grip bar 14 and the table top 10 can be varied, the relationship between the angle 40, the diameter of the rod portion 30, the thickness of the table top 10, and the diameter of the openings 26 should be such that the grip bar 14 will securely wedge in the aperture defined by the openings 26 in the plates 18, 20, respectively. Experimentation has shown that when the openings 26 measure one inch in diameter, the rod portion 30 is made of cold rolled steel and measures fifteen-sixteenths inch in diameter, and the plates 18, 20 are one-quarter inch thick and spaced apart one-half inch, the operable range of the angle 40 is from about fifty-eight degrees to about sixty-five degrees. If the dimensions of the table top 10 and the openings 26 remain constant, it has also been found that the angle 40 may become more acute than fifty-eight degrees if the diameter of the bar 14 is decreased.

When the clamping action of the grip bar 14 is to be released, the grip bar 14 is struck by a force in the direction of the arrow 56. This force urges the upper end of the grip bar 14 to the right, as seen in FIG. 5, in the direction of arrow 56 thereby straightening the leg portion 30 with respect to the aperture defined by the openings 26 in plates 18, 20, respectively, and freeing the leg portion 30 from the above-mentioned wedging action between the edges 52, 54 of the plates 18, 20, respectively, thus permitting the leg portions 30 and 32 to spring back to equilibrium relation.

While the grip bars 14 and the table top 10 can be made of different materials than that above-mentioned, the grip bar 14 must be made of a relatively strong and resilient material which is durable under the repeated impacts which it receives in use. Further, the material that the table top 10 is made of must be also relatively strong, rigid, and must further be of a material which will retain edges 52, 54 so that the wedging action between the table top 10 and the grip bar 14 will not deteriorate with use.

I claim as my invention:

1. A work table comprising
   a table top having a rectangular shape and a flat upwardly facing surface, said table top having a plurality of cylindrical apertures therein with axes generally perpendicular to said flat surface, said apertures being identically sized and arranged in rows and columns on said surface with four of said apertures adjacent to corners of said table top, each of said apertures being spaced apart from adjacent apertures, four elongated cylindrical legs positioned in said four apertures, means for removably securing said legs against removal from said apertures, and
   a resilient clamping rod having a diameter smaller than the diameter of said apertures and comprising two straight leg portions with an elbow portion therebetween, one of said straight portions having a flat clamp surface adjacent its distal end and defining an acute angle at said elbow with the other of said straight portions,
   the other of said straight portions being positioned in one of said apertures with said clamp surface facing said table top,
   the thickness of said table top and the diameters of said clamping rod and said apertures, respectively, being such as to securely wedge said other leg portion in said one aperture in an angular position with respect to the axis of said aperture and said table top when said clamp surface resiliently engages an object to be clamped between said clamp surface and said table top and said leg portions are resiliently spread apart and held in spread-apart relation by the engagement of said leg portions to said object and table top, respectively, and the resilient forces of said rod, whereby said object is securely clamped between said table top and said rod surface,
   said table top comprising a pair of rigid metal plates secured together in spaced-apart and parallel relation with a plurality of spacers therebetween, each of said plates having a plurality of openings therein and being in registry with the other of said plates, each of said openings in one of said plates being in registry with a like opening in the other of said plates thereby defining said apertures, and said leg securing means comprising a roll pin positioned between said plates and secured in a preformed hole in each leg adjacent to the top end thereof.

2. A work table comprising
   a table top having an upwardly facing surface and a plurality of apertures therein, said apertures being identically sized and arranged in spaced-apart relation with four of said apertures being adjacent the periphery of said table top and at the corners of a rectangular pattern,
   four legs secured in said four apertures, and
   an elongated and resilient clamping member having a cross-section of an identical shape as and a size smaller than said apertures, said member having two straight leg portions and an elbow portion therebetween, one of said leg portions having a clamp surface adjacent its distal end and defining an acute angle at said elbow with the other of said leg portions, said other leg portion being positioned in one of said apertures with said clamp surface facing said table top, the thickness of said table top and the respective cross-sectional sizes of said clamping member and said apertures being such as to securely wedge said other leg portion in said one aperture with said other leg portion angularly disposed to the longitudinal direction of said one aperture when said clamp surface resiliently engages an object to be clamped between said clamp surface and said table top and said leg portions are resiliently spread apart and held in spread-apart relation by the engagement of said leg portions with said object and said table top, respectively, and the resilient forces of said member, whereby said object is securely clamped between said table top and said clamp surface, said table top comprising a pair of sheets of rigid material secured together in spaced-apart and parallel relation with a plurality of spacers therebetween, each of said sheets having a plurality of openings therein and being in registry with the other of said sheets, and each of said openings in one of said sheets being in registry with a like opening in the other of said sheets thereby defining said apertures.

3. A work table comprising a table top formed to provide two rigid plates disposed in fixedly-spaced, substantially registering relation, each of said plates having a plurality of openings therethrough, each of said openings in one of said plates substantially registering with an opening in the other of said plates, and a resilient clamping rod formed to provide a first leg having a diameter less than the common diameter of said openings and to provide a second leg integrally arranged at an acute angle to said first leg, said first leg being positioned to penetrate a registering pair of openings in said plates with said second leg inclining toward said table top whereby, when the distal end of said second leg engages a workpiece on said table top and force is applied to said rod toward said table top sufficient resiliently to spread apart said legs, said first leg will be wedgingly retained in said registering openings.

References Cited
UNITED STATES PATENTS

| | | | |
|---|---|---|---|
| 735,947 | 8/1903 | Colt | 269—166 X |
| 739,365 | 9/1903 | Vogt | 269—166 |
| 2,147,800 | 2/1939 | Sadowski | 269—93 X |

ROBERT C. RIORDON, *Primary Examiner.*

E. SUTTON, *Assistant Examiner.*